US012770787B2

(12) United States Patent
Lee et al.

(10) Patent No.: US 12,770,787 B2
(45) Date of Patent: Oct. 20, 2026

(54) MULTILAYERED CAPACITOR INCLUDING AN ALUMINUM NITRIDE-BASED DIELECTRIC

(71) Applicant: SAMSUNG ELECTRO-MECHANICS CO., LTD., Suwon-si (KR)

(72) Inventors: Tae Kyung Lee, Suwon-si (KR); Jehong Kyoung, Suwon-si (KR); Sung-Min Cho, Suwon-si (KR); Taejoon Park, Suwon-si (KR); Sehun Park, Suwon-si (KR); Moonchul Lee, Suwon-si (KR); Joung Hun Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 154 days.

(21) Appl. No.: 18/667,583

(22) Filed: May 17, 2024

(65) Prior Publication Data

US 2025/0218673 A1 Jul. 3, 2025

(30) Foreign Application Priority Data

Dec. 29, 2023 (KR) ........................ 10-2023-0196170

(51) Int. Cl.
*H01G 4/08* (2006.01)
*H01G 4/008* (2006.01)
(Continued)

(52) U.S. Cl.
CPC ............... *H01G 4/08* (2013.01); *H01G 4/008* (2013.01); *H01G 4/012* (2013.01);
(Continued)

(58) Field of Classification Search
None
See application file for complete search history.

(56) References Cited

U.S. PATENT DOCUMENTS

2015/0103465 A1* 4/2015 Kang ..................... H01G 4/008 29/25.42
2016/0035493 A1 2/2016 Tsurumi et al.
(Continued)

FOREIGN PATENT DOCUMENTS

CN 115241159 A * 10/2022 ............. H10D 1/711
JP 2014-154632 A 8/2014
(Continued)

OTHER PUBLICATIONS

Pawar et al., "Growth assessment and scrutinize dielectric reliability of c-axis oriented insulating AlN thin films in MIM structures for microelectronics applications", Materials Chemistry and Physics, 219 (2018) pp. 74-81 (Year: 2018).*
(Continued)

*Primary Examiner* — Eric W Thomas
(74) *Attorney, Agent, or Firm* — Morgan, Lewis & Bockius LLP

(57) ABSTRACT

A multilayered capacitor according to present disclosure includes a dielectric layer including an aluminum nitride (AlN)-based compound, the aluminum nitride-based compound includes AlN, or a doped AlN compound in which AlN is doped with Ni, Co, Mn, Cr, V, Zn, Re, Ta, Nb, Ti, Zr, Mg, Sc, Er, Y, La, or a combination thereof, and a crystal orientation of the aluminum nitride-based compound is a c-axis crystal orientation.

19 Claims, 9 Drawing Sheets

(51) Int. Cl.
*H01G 4/012* (2006.01)
*H01G 4/12* (2006.01)
*H01G 4/30* (2006.01)
*H01G 4/33* (2006.01)

(52) U.S. Cl.
CPC ............. *H01G 4/1209* (2013.01); *H01G 4/30* (2013.01); *H01G 4/33* (2013.01)

(56) References Cited

U.S. PATENT DOCUMENTS

| | | | |
|---|---|---|---|
| 2022/0415912 A1 | 12/2022 | Tsunekawa | |
| 2023/0116719 A1 | 4/2023 | Karpov et al. | |
| 2025/0218674 A1* | 7/2025 | Lee ...................... | H01G 4/0085 |

FOREIGN PATENT DOCUMENTS

| | | |
|---|---|---|
| JP | 2023-129635 A | 9/2023 |
| KR | 10-2023-0043690 A | 3/2023 |
| KR | 10-2023-0091308 A | 6/2023 |

OTHER PUBLICATIONS

Fichner et al., "AlScN: A III-V semiconductor based ferroelectric", Journal of Applied Physics, 125, 114103 (2019) pp. 1-7 (Year: 2019).*

Martin et al., "Thickness dependence of the properties of highly c-axis textured AlN thin films", J. Vac. Sci. Technol., A 22, (2004), pp. 361-365 (Year: 2004).*

Pirro et al., Characterization of Dielectric and Piezoelectric Properties of Ferroelectric AlScN Thin Films, 2021, IEEE MEMS 2021 Virtual Conference, Jan. 2021, pp. 646-649 (Year: 2021).*

Nie et al., "Characterization of Ferroelectric Al0.7Sc0.3N Thin Film on Pt and Mo Electrodes", Micromachines 2022, 13, 1629, pp. 1-9 (Year: 2022).*

Schonweger et al. , "Ultrathin Al1—xScxN for Low-Voltage-Driven Ferroelectric-Based Devices", Phys. Status Solidi RRL 2022, 2200312, pp. 1-6 (Year: 2022).*

Office Action issued on Dec. 18, 2025 in U.S. Appl. No. 18/815,203.

U.S. Notice of Allowance issued on Apr. 17, 2026 in U.S. Appl. No. 18/815,203.

* cited by examiner

MULTILAYERED CAPACITOR INCLUDING AN ALUMINUM NITRIDE-BASED DIELECTRIC

CROSS-REFERENCE TO RELATED APPLICATION

This application claims priority to and the benefit of Korean Patent Application No. 10-2023-0196170 filed in the Korean Intellectual Property Office on Dec. 29, 2023, the entire contents of which are incorporated herein by reference.

TECHNICAL FIELD

The present disclosure relates to a multilayered capacitor.

BACKGROUND

Recently, as multi-functionalization and miniaturization of electronic devices have been rapidly progressing, miniaturization and performance improvement of electronic components have also been progressing at a rapid pace. Further, the demand for high reliability of electric devices for use in automobiles, network equipment, or the like and electronic components for use in industries has also been increasing significantly.

In order to meet such market demands, competition for technology development of passive components such as inductors, capacitors, or resistors has been accelerating. In particular, great effort has been required to dominate the market by developing various multilayer ceramic capacitor (MLCC) products whose applications and usage as passive components have been continuously increasing.

In addition, a multilayered capacitor is manufactured by stacking dielectric layers and internal electrodes, and is used in various electronic devices such as mobile phones, laptops, and LCD TVs.

With recent technological advancements, multilayered capacitors are required to have improved performance such as higher capacitance, improved capacitance density, and improved withstand voltage.

Recently, thin film capacitors, rather than the existing multilayered ceramic capacitor (MLCC) type, have been developed. In the case of the thin film capacitor, high capacitance can be achieved by maximizing an area of the capacitor and minimizing the thickness of the dielectric layer.

In order to implement thin film capacitors, there is a need to develop dielectric materials and electrode materials that can improve high capacitance and withstand voltage characteristics.

SUMMARY OF THE INVENTION

One aspect of the embodiment provides a multilayered capacitor that can improve withstand voltage characteristics and implement high capacitance.

However, the problems that the embodiments seek to solve are not limited to the above-described problems and can be expanded in various ways within the scope of the technical ideas included in the embodiments.

A multilayered capacitor according to an embodiment includes a dielectric layer including an aluminum nitride (AlN)-based compound, wherein the aluminum nitride-based compound includes AlN, or a doped AlN compound in which AlN is doped with Ni, Co, Mn, Cr, V, Zn, Re, Ta, Nb, Ti, Zr, Mg, Sc, Er, Y, La, or a combination thereof, the dielectric layer includes dielectric grains, and a crystal orientation of the dielectric grains is c-axis crystal orientation.

The aluminum nitride-based compound may include AlN, or the doped AlN compound in which the AlN is doped with Sc, Er, Y, La, or a combination thereof.

A content (at %) of doped element in the doped AlN compound may be greater than or equal to about 1 at % and less than about 30 at %.

The aluminum nitride-based compound included in the dielectric layer may have a hexagonal (HCP) crystal structure and may have a (0002) crystal plane.

An average thickness of the dielectric layer may be in a range from about 20 nm to about 400 nm.

The multilayered capacitor may include a substrate; a base layer on the substrate; internal electrodes and dielectric layers alternately disposed on the base layer; and an external electrode disposed on the base layer and disposed outside the internal electrode and the dielectric layer.

The internal electrode includes the first internal electrode and the second internal electrode, the first internal electrode and the second internal electrode include a conductive metal including Mo, W, Ru, Ti, Pt, Al, or a combination thereof, and conductive metals included in the first internal electrode and the second internal electrode may be different.

The internal electrodes may include a conductive metal having a BCC crystal structure and a (110) crystal plane, a conductive metal having an HCP crystal structure and a (0002) crystal plane, a conductive metal having an FCC crystal structure and a (111) crystal plane, or a combination thereof.

The multilayered capacitor may further include an internal electrode stack between the base layer and the dielectric layer.

An average thickness of the internal electrodes may be in a range from about 20 nm to about 400 nm.

The multilayered capacitor may further include a seed layer between the base layer and the internal electrode.

A multilayered capacitor according to another embodiment includes a substrate; a base layer on the substrate; internal electrodes and dielectric layers alternately disposed on the base layer; and an external electrode disposed on the base layer and disposed outside the internal electrode and the dielectric layer, wherein the dielectric layer includes an aluminum nitride (AlN)-based compound including AlN, or an AlN compound in which the AlN is doped with Ni, Co, Mn, Cr, V, Zn, Re, Ta, Nb, Ti, Zr, Mg, Sc, Er, Y, La, or a combination thereof, the dielectric layer includes a plurality of dielectric grains, and a crystal orientation of the dielectric grains is a c-axis crystal orientation, the internal electrode includes a first internal electrode and a second internal electrode, the first internal electrode and the second internal electrode include a conductive metal including Mo, W, Ru, Ti, Pt, Al, or a combination thereof, and types of conductive metals included in the first internal electrode and the second internal electrode are different.

The multilayered capacitor according to the embodiment has the advantage of improving withstand voltage characteristics and realizing high capacitance.

However, the various and beneficial advantages and effects of the present invention are not limited to the above-described descriptions, and may be more easily understood in the process of explaining specific embodiments of the present invention.

DETAILED DESCRIPTION OF THE EMBODIMENTS

Figure 1:
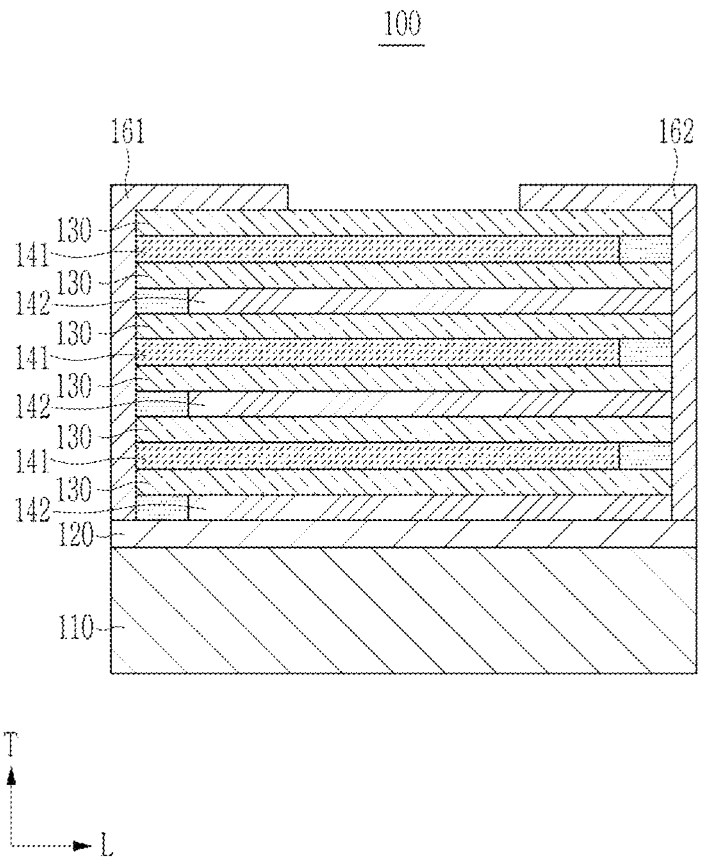
FIGS. 1 to 4 are cross-sectional views schematically showing multilayered capacitors 100 according to embodiments.

Hereinafter, exemplary embodiments of the present invention will be described in detail with reference to the accompanying drawings such that those skilled in the art can easily implement them. The drawings and description are to be regarded as illustrative in nature and not restrictive. Like reference numerals designate like elements throughout the specification. Further, the accompanying drawings are provided for helping to easily understand exemplary embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

Terms including an ordinary number, such as first and second, are used for describing various constituent elements, but the constituent elements are not limited by the terms. The terms are used only to discriminate one constituent element from another constituent element.

When a constituent element is referred to as being "connected" or "coupled" to another constituent element, it will be appreciated that it may be directly connected or coupled to the other constituent element, or face the other constituent element, or intervening other constituent elements may be present. In contrast, when a constituent element is referred to as being "directly connected" or "directly coupled" to another constituent element, it will be appreciated that there are no intervening other constituent elements present.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. Accordingly, unless explicitly described to the contrary, the word "comprise," and variations such as "comprises" or "comprising," will be understood to imply the inclusion of stated elements but not the exclusion of any other elements.

Throughout the specification, the "stacking direction" refers to a direction in which the components are sequentially stacked, and may also be a "thickness direction" perpendicular to the wide surface (main surface) of the components on the sheet. In the drawings, it corresponds to the T-axis direction. Also, the "lateral direction" refers to a direction extending parallel to the wide surface (main surface) from the edge of the sheet-like component, which can be a "plane direction," and corresponds to the L-axis direction in the drawing. The W-axis direction in the drawing may be the "width direction."

Throughout the specification, in the multilayered capacitor 100, two surfaces facing each other in the thickness direction (T-axis direction) may be defined as a first surface and a second surface, and two surfaces that are coupled to the first surface and the second surface and face each other in the longitudinal direction (L-axis direction) may be defined as a third surface and a fourth surface, and two surfaces that are coupled to the first surface and the second surface, are coupled to the third surface and the fourth surface, and face each other in the width direction (W-axis direction) may be defined as a fifth surface and a sixth surface.

As an example, the first surface which is the lower surface may be a surface oriented to the mounting direction. Further, the first surface to the sixth surface may be flat; however, the present exemplary embodiment is not limited thereto, and for example, the first surface to the sixth surface may be curved surfaces with convex center portions, and the border of each surface, i.e., the edge may be rounded.

The shape and dimensions of the multilayered capacitor 100 and the number of dielectric layer 130 that are stacked are not limited to those shown in the drawings of the present embodiment.

Additionally, the multilayered capacitor 100 may include an active region and a cover region.

The active region is a portion that contributes to the formation of the capacitance of the multilayered capacitor 100. As an example, the active region may be the region where the first internal electrodes 141 and the second internal electrodes 142 that are stacked along the thickness direction (T-axis direction) overlap.

The cover regions are margin portions in the thickness direction, and may be positioned on the first surface side and second surface side of the active region in the thickness direction (T-axis direction). Additionally, the multilayered capacitor 100 may further include a side cover region. The side cover regions are margin portions in the width direction, and may be positioned on the fifth surface side and sixth surface side of the active region in the width direction (W-axis direction), respectively.

For example, the cover region may be a single dielectric layer 130 or two or more dielectric layers 130 stacked on the upper and lower surfaces of the active region, respectively. For example, the cover region may include an insulating material such as silicon dioxide ($SiO_2$), silicon nitride (SiN, $Si_3N_4$), aluminum nitride (AlN), or aluminum oxide ($Al_2O_3$).

The cover region and the side cover region serve to prevent damage to the first internal electrode 141 and the second internal electrode 142 due to physical or chemical stress.

Hereinafter, various embodiments and modifications will be described in detail with reference to the drawings.

FIGS. 1 to 4 are cross-sectional views schematically showing multilayered capacitors 100 according to embodiments.

Referring to FIGS. 1 to 4, a multilayered capacitor 100 according to an embodiment includes a substrate 110; a base layer 120 on the substrate 110; a capacitor body disposed on the base layer 120 and including internal electrodes 141 and 142 and dielectric layers 130 arranged alternately; and external electrodes 161 and 162 disposed on the base layer 120 and disposed outside the capacitor body.

Figure 2:
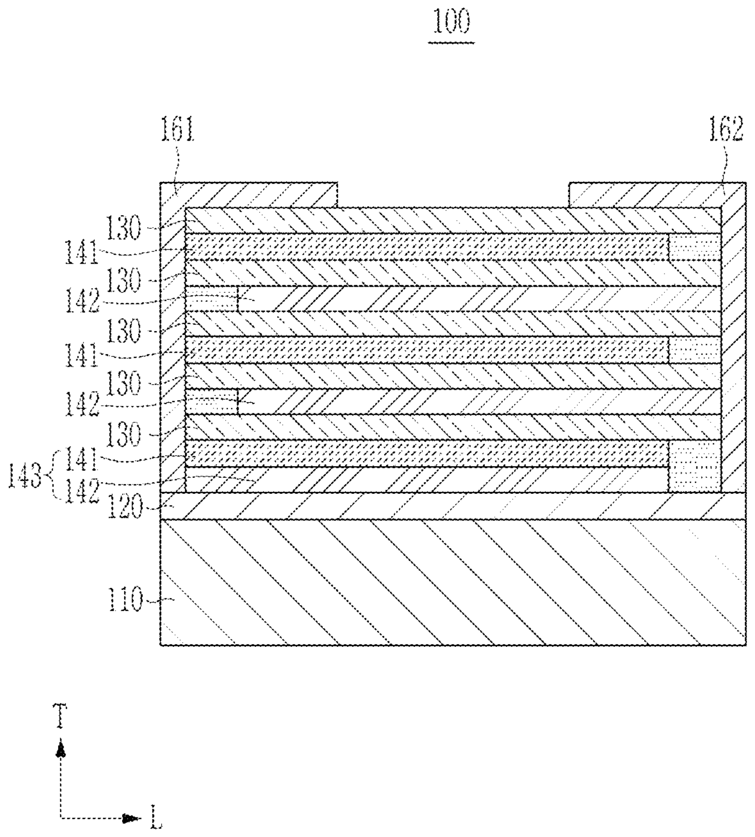
Figure 3:
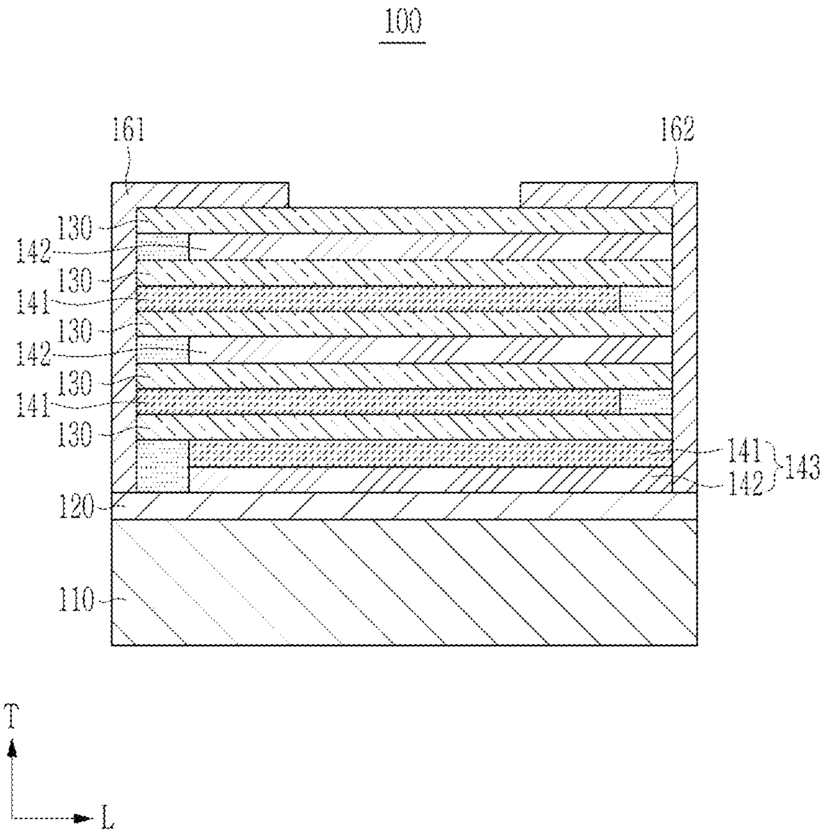

Referring to FIGS. 2 and 3, the multilayered capacitor 100 may further include an internal electrode stack 143 disposed between the base layer 120 and the dielectric layer 130.

Figure 4:
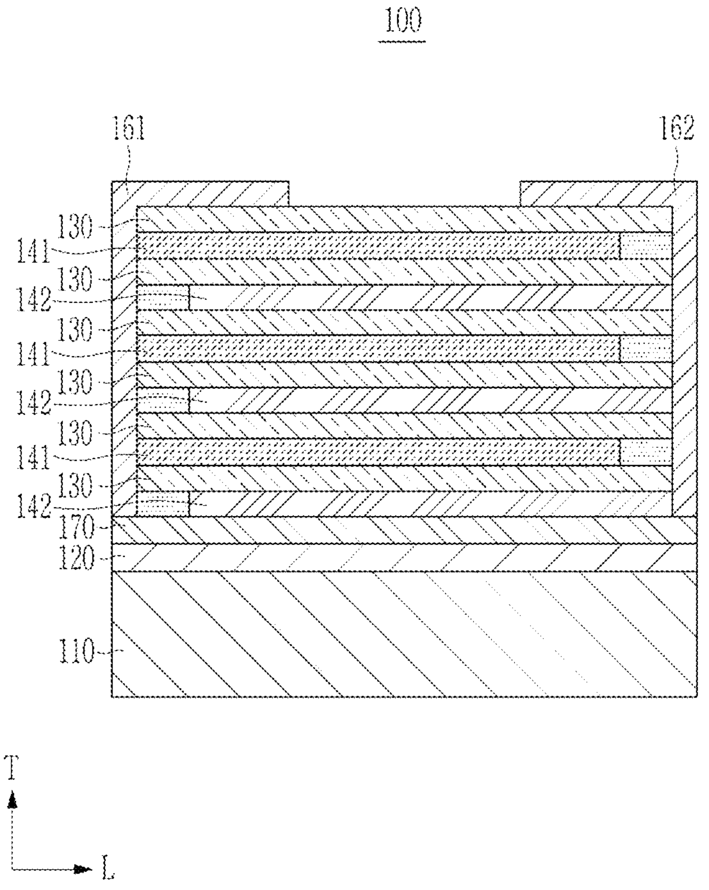

Referring to FIG. 4, the multilayered capacitor 100 may further include a seed layer 170 between the base layer 120 and the capacitor body.

The substrate 110 may include a silicon substrate, and may include, for example, a silicon wafer (Si wafer) or SOI (Silicon On Insulator) type substrate. The base layer 120 serves as a buffer layer to prevent the substrate 110 from being etched when the electrode-dielectric layer to be described later is etched by a dry etching process after depositing the dielectric layer 130 and the internal electrodes 141 and 142. The base layer 120 may include silicon dioxide ($SiO_2$), silicon nitride (SiN, $Si_3N_4$), aluminum nitride (AlN), aluminum oxide ($Al_2O_3$), or a combination thereof.

Dielectric Layer

A multilayered capacitor 100 according to an embodiment includes a dielectric layer including an aluminum nitride (AlN)-based compound 130, the aluminum nitride-based compound includes AlN, or an AlN compound in which AlN is doped with Ni, Co, Mn, Cr, V, Zn, Re, Ta, Nb, Ti, Zr, Mg, Sc, Er, Y, La, or a combination thereof, the dielectric layer includes a plurality of dielectric grains, and a crystal orientation of the dielectric grain is c-axis crystal orientation.

As an example, the AlN-based compound included in the dielectric layer 130 may have a hexagonal (HCP) crystal structure and a (0002) crystal plane perpendicular to the c-axis.

As an example, the aluminum nitride (AlN)-based compound may include AlN, or an AlN compound doped with Ta, Nb, Ti, Zr, Mg, Sc, Er, Y, La, or a combination thereof.

As a specific example, the aluminum nitride (AlN)-based compound may include AlN or an AlN compound doped with Sc, Er, Y, La, or a combination thereof.

The aluminum nitride (AlN)-based compound may include an AlN compound in which Al sites are doped with other elements to implement a high-capacitance dielectric.

As an example, the compound doped into AlN is substituted at the Al site of AlN to increase the dielectric constant of the doped compound, thereby realizing a high-capacitance dielectric.

For example, when the atomic size of the atom doped into AlN is larger than that of the Al atom, distortion of the unit lattice occurs in the doped compound, and the net polarity increases compared to AlN, thereby increasing the dielectric constant.

As an example, the AlN may be doped with an element having an atomic radius larger than that of the Al atom. As an example, the AlN may be doped with an element having an atomic radius of greater than about 1.43 Å. As a specific example, AlN may be doped with an element having an atomic radius of greater than or equal to about 1.60 Å.

In an embodiment, the content (atomic %, at %) of the doped element in the doped AlN compound may be greater than or equal to about 1 at %, greater than or equal to about 5 at %, or greater than or equal to about 10 at %, and less than about 30 at %, less than or equal to about 25 at %, or less than or equal to about 20 at %.

If the content of the doped element in the doped AlN compound is less than about 1 at %, it may be difficult to implement a high-capacitance dielectric by doping, and if it is greater than about 30 at %, a brittle crystal phase is created, making it difficult to manufacture a dielectric for sputtering, and there may be a lot of growth of abnormal grains in the dielectric layer 130.

As an example, the dielectric layer 130 includes a plurality of dielectric grains, and the dielectric grains may include the aforementioned aluminum nitride-based compound.

In an embodiment, a crystal orientation of the dielectric grain is c-axis crystal orientation.

In order to deposit the dielectric layer 130 including the aluminum nitride-based compound on the substrate 110 in a semi-epitaxy manner, the crystal orientation of the grains in the dielectric layer 130 may be aligned in the c-axis crystal orientation.

When the crystal orientation of the aluminum nitride-based compound is aligned with the c-axis crystal orientation, defect sites in the dielectric layer 130 are reduced, and withstand voltage characteristics can be improved.

As an example, the crystal orientation of the dielectric layer 130 can be confirmed through high resolution XRD or HR-TEM analysis.

As an example, after performing High resolution XRD Rocking curve analysis on the dielectric layer 130, the full width at half maximum (FWHM) of the main peak and the intensity of the main peak can be measured in the XRD graph.

For example, the higher the c-axis crystal orientation of the aluminum nitride-based compound included in the dielectric layer 130, the smaller the FWHM value may be.

For example, the higher the c-axis crystal orientation of the aluminum nitride-based compound included in the dielectric layer 130, the smaller the FWHM/Intensity value, which is a value normalized by FWHM to intensity, may be smaller.

For example, the average thickness of the dielectric layer 130 may be greater than or equal to about 20 nm, greater than or equal to about 50 nm, greater than or equal to about 100 nm, or greater than or equal to about 200 nm, and may be less than or equal to about 400 nm, or less than or equal to about 300 nm.

If the average thickness 130 of the dielectric layer is less than about 20 nm, short circuit between internal electrodes may occur, and if it is more than about 400 nm, it may be difficult to implement a high-capacitance thin film capacitor.

The method for measuring the average thickness of the dielectric layer 130 is as follows.

First, the multilayered capacitor 100 is placed in an epoxy mixture and cured, and the L-axis and T-axis direction sides of the multilayered capacitor 110 are polished to ½ the point in a W-axis direction, then placed in a vacuum atmosphere chamber, and then, cut in the L-axis direction and the T-axis direction from the center of the W-axis direction of the multilayered capacitor 100 to prepare a cross-sectional sample (hereinafter referred to as "cross-sectional sample").

SEM or TEM images are obtained by observing the cross-sectional sample with a scanning electron microscope (SEM) or transmission electron microscope (TEM).

It may be an arithmetic mean value of the thickness the dielectric layer 130 at 10 points spaced at predetermined intervals from a reference point in the SEM or TEM image of the cross-sectional sample, when the center point in the longitudinal direction (L-axis direction) or width direction (W-axis direction) of the dielectric layer 130 is used as a reference point.

The intervals between the 10 points may be adjusted according to the scale of the SEM image. In this case, all 10 points should be located within the dielectric layers 130, and when all 10 points are not located within the dielectric layers 130, the position of the reference point may be changed or the interval of 10 points may be adjusted.

Internal Electrode

The internal electrodes include a first internal electrode 141 and a second internal electrode 142, which are electrodes having different polarities and are alternately arranged opposite each other along the T-axis direction with the dielectric layer 130 in between, and one end may be exposed through the third and fourth surfaces of the multilayered capacitor 100, respectively.

The first internal electrodes 141 and the second internal electrodes 142 may be electrically insulated from each other by the dielectric layers 130 disposed therebetween.

The ends of the first internal electrode 141 and the second internal electrode 142 alternately exposed through the third and fourth surfaces of the multilayered capacitor 100 may be connected the first external electrode 161 and the second external electrode 162 to be electrically connected to each other.

In an embodiment, the internal electrodes 141 and 142 may include an electrode material that can minimize a lattice mismatch rate (%) with a crystal unit cell of the aluminum nitride (AlN)-based compound included in the dielectric layer 130.

The AlN-based compound included in the dielectric layer 130 has a hexagonal (HCP) crystal structure, has a (0002) crystal plane perpendicular to the c-axis, and can grow on the internal electrodes 141 and 142.

Herein, for the internal electrodes 141 and 142, a material that can minimize the lattice mismatch rate with the crystal unit cell of an AlN-based compound with a hexagonal (HCP) crystal structure and a (0002) crystal plane can be used. When such a material is used as an internal electrode material, the crystal orientation of the dielectric layer 130 can be improved and leakage current of the capacitor can be reduced.

Figure 5:
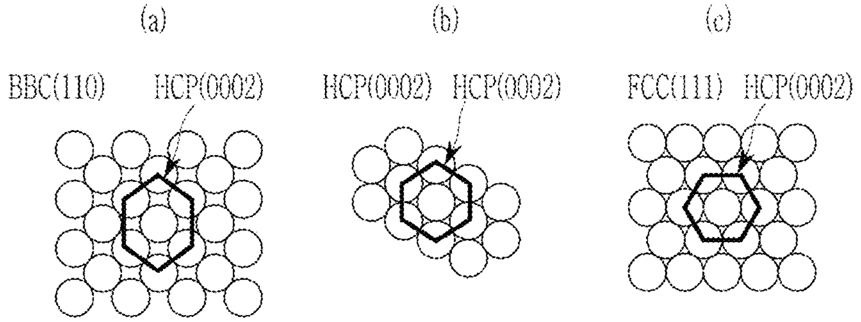
FIG. 5 is a schematic view schematically showing the crystal structure and crystal plane of an internal electrode material according to an embodiment.

FIG. 5 is a schematic view schematically showing the crystal structure and crystal plane of an internal electrode material according to an embodiment.

Referring to FIGS. 5(*a*) to 5(*c*), in relation to the AlN-based dielectric material having a HCP (0002) crystal structure, when the internal electrode material has a body centered cubic (BCC) crystal structure, it can be confirmed that a preferred crystal orientation is formed when it has a (110) crystal plane.

In addition, when the internal electrode material has a hexagonal (HCP) crystal structure, it can be confirmed that a preferred crystal orientation is formed when it has a (0002) crystal plane.

In addition, when the internal electrode material has a face-centered cubic (FCC) crystal structure, a preferred crystal orientation may be formed when it has a (111) crystal plane.

When a preferred crystal orientation is formed, the lattice mismatch rate with the dielectric layer material can be within 20%, allowing the dielectric layer 130 to be grown in semi-epitaxy.

In an embodiment, the first internal electrode 141 and the second internal electrode 142 may include a conductive metal, and the conductive metal may include Mo, W, Ru, Ti, Pt, Al, or a combination thereof. For example, the types of conductive metal included in the first internal electrode 141 and the second internal electrode 142 may be different.

For example, the first internal electrode 141 and second internal electrode 142 may include conductive metal having a BCC crystal structure and a (110) crystal plane, a conductive metal having an HCP crystal structure and a (0002) crystal plane, a conductive metal having an FCC crystal structure and a (111) crystal plane, or a combination thereof.

As a specific example, the conductive metal having a BCC crystal structure and a (110) crystal plane may include Mo or W.

As a specific example, the conductive metal having the HCP crystal structure and a (0002) crystal plane may include Ru or Ti.

As a specific example, the conductive metal having the FCC crystal structure and a (111) crystal plane may include Pt or Al.

Referring to FIGS. 2 and 3, the multilayered capacitor 100 may further include an internal electrode stack 143 between the base layer 120 and the dielectric layer 130.

As an example, the internal electrode stack 143 may be an internal electrode at the bottom of the capacitor body.

The internal electrode stack 143 may be disposed between the base layer 120 and the dielectric layer 130 at the bottom of the capacitor body.

The internal electrode stack 143 may be a stack of the first internal electrode 141 and the second internal electrode 142 in direct contact, and at this time, the types of conductive metal included in the first internal electrode 141 and the second internal electrode 142 may be different.

The internal electrode stack 143 has a structure in which electrodes containing two different materials are alternatively stacked so that one internal electrode disposed at the bottom of the internal electrode stack 143 may improve crystal orientation of the other internal electrode on top of the internal electrode stack 143, and if the dielectric layer 130 is disposed on top of this electrode stack, crystal orientation of the dielectric layer 130 may be further improved.

For example, the internal electrodes 141 and 142 constituting the internal electrode stack 143 may include Mo, W, Ru, Ti, Pt, Al, or a combination thereof, but the first internal electrode 141 and the second internal electrode 142 may include different types of the conductive metals.

Specifically, the internal electrode stack 143 may include, for example, a Mo (bottom)/Ti (top) or Ti (bottom)/Mo (top) stack.

For example, the average thickness of the internal electrodes 141 and 142 may be greater than or equal to about 20 nm, greater than or equal to about 50 nm, greater than or equal to about 100 nm, or greater than or equal to about 150 nm, and less than or equal to about 400 nm, or less than or equal to about 300 nm.

For example, the average thickness of the internal electrode stack 143 may be greater than or equal to about 50 nm, greater than or equal to about 100 nm, or greater than or equal to about 150 nm, and less than or equal to about 500 nm, less than or equal to about 400 nm, or less than or equal to about 300 nm.

The average thickness of the internal electrodes 141 and 142 or internal electrode stack 143 may be measured by the following method.

It may be an arithmetic mean value of the thickness the internal electrodes 141 and 142 or internal electrode stack 143 at 10 points spaced at predetermined intervals from a reference point in the SEM or TEM image of the cross-sectional sample, when the center point in the longitudinal direction (L-axis direction) or width direction (W-axis direction) of the internal electrodes 141 and 142 or internal electrode stack 143 is used as a reference point.

The intervals between the 10 points may be adjusted according to the scale of the SEM image. In this case, all 10 points should be located within the internal electrodes 141 and 142 or internal electrode stack 143, and when all 10 points are not located within the internal electrodes 141 and 142 or internal electrode stack 143, the position of the reference point may be changed or the interval of 10 points may be adjusted.

Seed Layer

Referring to FIG. 4, the multilayered capacitor 100 according to an embodiment may further include a seed layer 170 between the base layer 120 and the capacitor body.

The multilayered capacitor 100 according to another embodiment may further include a seed layer 170 between the base layer 120 and the internal electrode stack 143.

The seed layer 170 may be disposed at the bottom of the internal electrodes 141 and 142 or the internal electrode 143 and function as a seed for forming the internal electrodes.

If the seed layer 170 is further included, crystal orientation of the internal electrodes 141 and 142 disposed on the seed layer 170 may be improved, and if the dielectric layer 130 is disposed on the internal electrodes 141 and 142, crystal orientation of the dielectric layer 130 may be further improved.

For example, the seed layer 170 may include the same compound as the aforementioned dielectric layer 130 and specifically, include a aluminum nitride (AlN)-based compound as a dielectric, wherein the aluminum nitride (AlN)-based compound may include AlN; a compound of the AlN doped with Ta, Nb, Ti, Zr, Mg, Sc, Er, Y, La, Ni, Co, Mn, Cr, V, Zn, Re, or a combination thereof; or a combination thereof.

The seed layer 170 may have an average thickness of greater than or equal to about 10 nm, greater than or equal to about 20 nm, or greater than or equal to about 40 nm and less than or equal to about 100 nm, less than or equal to about 80 nm, or less than or equal to about 60 nm.

A method of measuring the average thickness of the seed layer 170 may be the same as the method of measuring the average thickness of the dielectric layer 130 or the internal electrodes 141 and 142.

External Electrode

The first external electrode 161 and the second external electrode 162 are provided with voltages with different polarity and respectively connected electrically to each exposed portion of the first internal electrode 141 and the second internal electrode 142.

According to the above configuration, if a predetermined voltage is applied to the first external electrode 161 and the second external electrode 162, charges are accumulated between the first internal electrode 141 and the second internal electrode 142 facing each other. Herein, the multilayered capacitor 100 may have proportional capacitance to an area where the first internal electrode 141 and the second internal electrode 142 are overlapped each other along a T-axis direction in the active region.

For example, the first external electrode 161 and the second external electrode 162 respectively may further include a sintering metal layer, a conductive resin layer disposed to cover the sintering metal layer, and a plating layer disposed to cover the conductive resin layer.

The sintered metal layer may include a conductive metal and glass.

As an example, the sintered metal layer may include, as the conductive metal, copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and for example, copper (Cu) may include a copper (Cu) alloy. When the conductive metal includes copper, metals other than copper may be included in the amount of less than or equal to about 5 parts by mole based on 100 parts by mole of copper.

As an example, the sintered metal layer may include a composition including oxides as glass, and may include, for example, one or more selected from silicon oxides, boron oxides, aluminum oxides, transition metal oxides, alkali metal oxides, and alkaline earth metal oxides. The transition metal may be selected from zinc (Zn), titanium (Ti), copper (Cu), vanadium (V), manganese (Mn), iron (Fe), and nickel (Ni), and the alkali metal may be selected from lithium (Li), sodium (Na), and potassium (K), and the alkaline earth metal may be one or more selected from magnesium (Mg), calcium (Ca), strontium (Sr), and barium (Ba).

Optionally, the conductive resin layer is formed on the sintered metal layer, and for example, may be formed to completely cover the sintered metal layer. Meanwhile, the first external electrode 161 and the second external electrode 162 may not include a sintered metal layer.

The conductive resin layers may extend to the first and second surfaces or fifth and sixth surfaces of the multilayered capacitor 100, and the lengths of regions (i.e., band portions) where the conductive resin layers extend to the first and second surfaces or fifth and sixth surfaces of the multilayered capacitor 100 may be longer than the lengths of regions (i.e., band portions) where the sintered metal layers extend in the first and second surfaces or fifth and sixth surfaces of the multilayered capacitor 100. In other words, the conductive resin layers may be formed on the sintered metal layers, and may be formed so as to completely cover the sintered metal layers.

The conductive resin layers include a resin and a conductive metal.

The resin which is included in the conductive resin layers is not particularly limited as long as it has a bonding property and an impact absorption property and can be mixed with conductive metal powder to form a paste, and may include, for example, a phenolic resin, an acrylic resin, a silicone resin, an epoxy resin, or a polyimide resin.

The conductive metal that is included in the conductive resin layers serves to electrically connect the conductive resin layers to the first internal electrode 141 and the second internal electrode 142, or the sintered metal layer.

The conductive metal that is included in the conductive resin layer may have a spherical shape, a flake shape, or a combination thereof. In other words, the conductive metal may be formed only in a flake shape, or may be formed only in a spherical shape, or may be the form of a mixture of a flake shape and a spherical shape.

Herein, the spherical shape may include a shape which is not completely spherical, and may include, for example, a shape in which a ratio of the length of the major axis to the length of the minor axis (major axis/minor axis) may be less than or equal to about 1.45. The flake-type powder refers to a powder with a flat and elongated shape, and is not particularly limited, but for example, a ratio of the length of the major axis to the length of the minor axis (major axis/minor axis) may be greater than or equal to about 1.95.

The first external electrode 161 and the second external electrode 162 may further include a plating layer disposed outside the conductive resin layer.

The plating layer may include nickel (Ni), copper (Cu), tin (Sn), palladium (Pd), platinum (Pt), gold (Au), silver (Ag), tungsten (W), titanium (Ti), or lead (Pb) which may be included alone or alloys thereof. As an example, each plating layer may be a nickel (Ni) plating layer or a tin (Sn) plating layer, or may be a form in which a nickel (Ni) plating layer and a tin (Sn) plating layer are sequentially stacked, or may be a form in which a tin (Sn) plating layer, a nickel (Ni) plating layer, and a tin (Sn) plating layer are sequentially stacked. Alternatively, each plating layer may include a plurality of nickel (Ni) plating layers and/or a plurality of tin (Sn) plating layers.

The plating layer can improve mountability to the substrate, structural reliability, durability to the outside, heat resistance, and equivalent series resistance (ESR) of the multilayered capacitor 100.

Method of Manufacturing Multilayered Capacitor

A method of manufacturing the multilayered capacitor according to an embodiment includes (1) depositing a base layer on a substrate; (2) depositing an electrode-dielectric stack in which a first internal electrode, a dielectric layer, and a second internal electrode are alternately deposited on the base layer; (3) grooving the electrode-dielectric stack through a dry slope etching process; (4) wet-etching the second internal electrode and also, wet-etching the first internal electrode; (5) depositing a side cover region in the cavity formed in the wet-etching; (6) patterning the cover region at the top end of the electrode-dielectric layer stack to manufacture a capacitor stack; and (7) forming an external electrode at the outside of the capacitor stack.

For example, after depositing the base layer on the substrate before depositing the electrode-dielectric stack, a seed layer may be further deposited.

Figure 8:
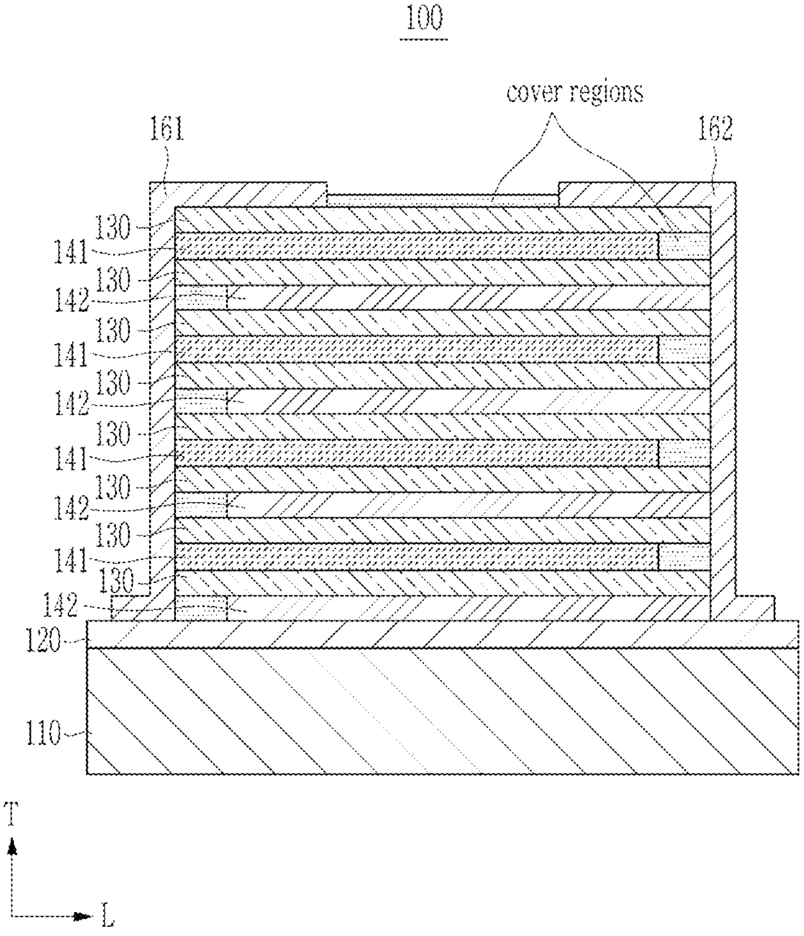
FIG. 8 is a schematic view schematically showing a multilayered capacitor manufactured by a method for manufacturing a multilayered capacitor according to an embodiment.
Figure 9:
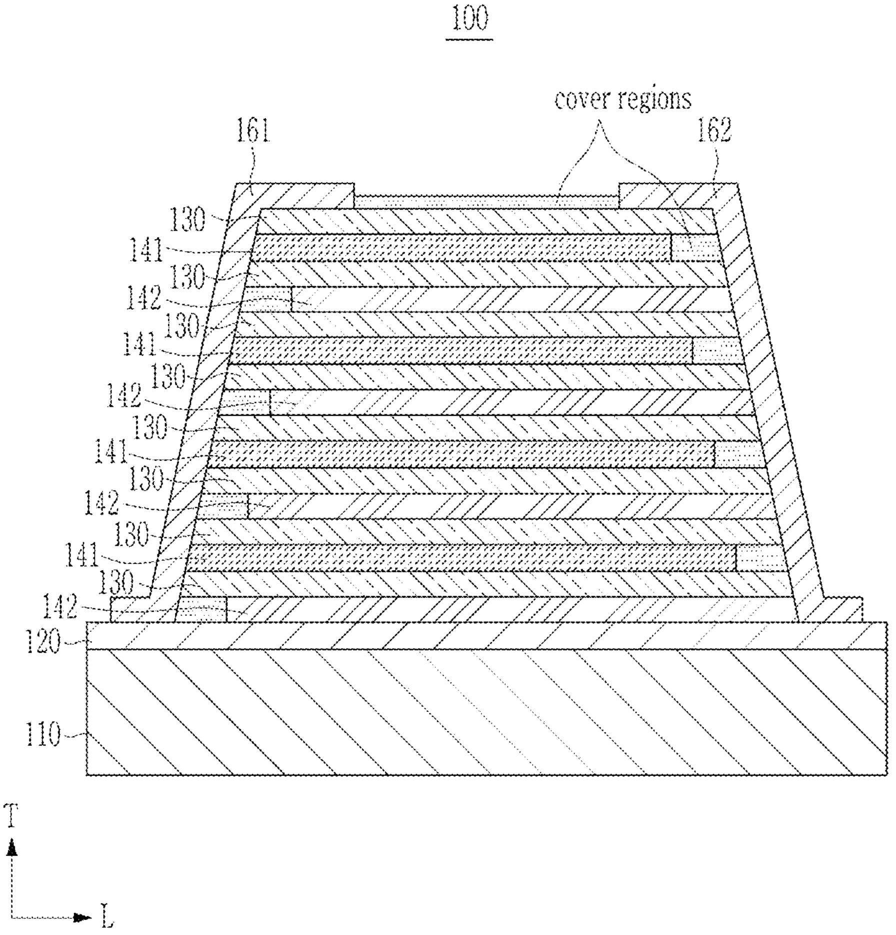
FIG. 9 is a schematic view schematically showing a multilayered capacitor manufactured by a method for manufacturing a multilayered capacitor according to another embodiment.

FIG. 8 is a schematic view schematically showing a multilayered capacitor manufactured by a method for manufacturing a multilayered capacitor according to an embodiment. FIG. 9 is a schematic view schematically showing a multilayered capacitor manufactured by a method for manufacturing a multilayered capacitor according to another embodiment.

Hereinafter, each manufacturing method will be described with reference to FIGS. 8 and 9.

First, in the deposition of the base layer on the substrate, a (RF magnetron) sputtering process, a chemical vapor deposition (CVD) process, an atomic layer deposition (ALD) process, an evaporation process, or the like may be used.

The sputtering process may include magnetron sputtering, RF magnetron sputtering, laser sputtering, direct current (DC) sputtering, or the like.

Subsequently, the deposition of the electrode-dielectric stack, in which the first internal electrode, the dielectric layer, and the second internal electrode are alternately deposited on the base layer, is illustrated.

For example, the electrode-dielectric stack may be formed by multiple times depositing the first internal electrode, the dielectric layer, the second internal electrode, and the dielectric layer in order on the base layer. For example, the internal electrode may be disposed right on the base layer. For example, the dielectric layer may be disposed at the top of the electrode-dielectric stack.

A method of depositing the internal electrode and the dielectric layer may be the same as the method of depositing the base layer and performed mainly through the sputtering process.

The grooving the electrode-dielectric stack through the dry slope etching process may be etching the electrode-dielectric stack except for the substrate. Herein, the base layer may play a role of protecting the substrate from the dry slope etching.

Referring to FIG. 9, the electrode-dielectric stack grooved through the dry slope etching process may have a trapezoid shape widening from the top to the bottom when viewed in a cross section obtained by cutting the multilayered capacitor in L-axis and T-axis directions at the center of a W-axis direction. For example, the trapezoid-shaped electrode-dielectric stack may have a lower slop with an angle of about 80° or less. If the trapezoid-shaped electrode-dielectric stack is included, the multilayered capacitor may be easily connected to external electrodes.

The wet-etching of the second internal electrode and the wet-etching of the first internal electrode may be forming a cavity by wet-etching the sides of the internal electrodes. Subsequently, the cavity is charged with an insulating material to form the side cover region.

For example, when the first internal electrode is wet-etched, the second internal electrode must not be etched, but when the second internal electrode is wet-etched, the first internal electrode must not be etched. Accordingly, the types of conductive metals included in the first internal electrode and the second internal electrode may be different form each other.

The depositing the side cover region in the cavity formed in the wet-etching may be charging an insulating material in the cavity.

A method of charging the insulating material in the cavity may include, for example, an atomic layer deposition (ALD) process.

The insulating material may include silicon dioxide ($SiO_2$), silicon nitride (SiN, $Si_3N_4$), aluminum nitride (AlN), aluminum oxide ($Al_2O_3$), or a combination thereof.

Subsequently, the formation of the capacitor stack by patterning the cover region at the top end of the electrode-dielectric layer stack may be patterning the insulating material into a portion of the top of the electrode-dielectric layer stack.

The patterning the insulating material into the portion of the top of the electrode-dielectric layer stack may be performed by using a lift-off process.

The insulating material may include silicon dioxide ($SiO_2$), silicon nitride (SiN, $Si_3N_4$), aluminum nitride (AlN), aluminum oxide ($Al_2O_3$), or a combination thereof.

The forming an external electrode at the outside of the capacitor stack may be depositing a conductive metal on the outside of the capacitor stack.

Referring to FIGS. 8 and 9, the deposited external electrode may be connected to a side of the upper cover region and formed on the top of the base layer along the outside of the capacitor body.

Types of the conductive metal may be the same as illustrated in the external electrode.

A method of depositing the conductive metal at the outside of the capacitor stack may include a sputtering (RF magnetron sputtering) process, chemical vapor deposition (CVD) process, an atomic layer deposition (ALD) process, an evaporation process, or the like.

The sputtering process may include magnetron sputtering, RF magnetron sputtering, laser sputtering, direct current (DC) sputtering, or the like.

Hereinafter, specific examples of the invention will be presented. However, the following examples are intended only to specifically illustrate or describe the invention, and should not be construed as limiting the scope of the invention.

REFERENCE EXAMPLE

Reference Example 1: Evaluation of Elements That Can Be Doped Into AlN

Table 1 shows whether or not each doping element may be substituted at an Al site of AlN and an atom radius of the doping element.

TABLE 1

| Doping element | AlN is doped or not | Atomic radius (Å) |
|---|---|---|
| Al | | 1.43 |
| Cu | X | 1.28 |
| Ru | X | 1.34 |
| Ir | X | 1.36 |
| W | X | 1.39 |
| Mo | X | 1.39 |
| Pt | X | 1.39 |
| Au | X | 1.44 |
| Ni | 0 | 1.24 |
| Co | 0 | 1.25 |
| Mn | 0 | 1.27 |
| Cr | 0 | 1.28 |
| V | 0 | 1.34 |
| Zn | 0 | 1.34 |
| Re | 0 | 1.37 |
| Ta | 0 | 1.46 |
| Nb | 0 | 1.46 |
| Ti | 0 | 1.47 |
| Zr | 0 | 1.60 |
| Mg | 0 | 1.60 |
| Sc | 0 | 1.62 |
| Er | 0 | 1.76 |
| Y | 0 | 1.80 |
| La | 0 | 1.87 |

Referring to Table 1, Ta, Nb, Ti, Zr, Mg, Sc, Er, Y, and La having a larger atom radius than that (1.43 Å) of Al may be substituted at the Al site of AlN, and among them, Sc, Er, Y, and La having an atom radius of 1.60 Å or more may be substituted at the Al site.

Reference Example 2: Evaluation of Dielectric Constant According to Doping Element Content An AlScN compound prepared by doping AlN with an Sc element is measured with respect to a dielectric constant according a Sc content (at %), and the results are shown in Table 2 and FIG. 6.

TABLE 2

| Sc content in AlScN (at %) | Dielectric constant |
|---|---|
| 0 | 11.12 |
| 10 | 13.45 |
| 20 | 18.53 |
| 30 | 26.26 |

Figure 6:
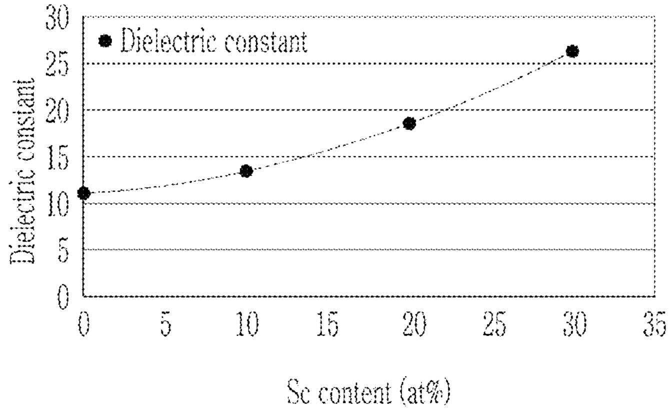
FIG. 6 is a graph showing the results of measuring the dielectric constant value of the AlScN compound according to the Sc content (at %).

Referring to Table 2 and FIG. 6, as the Sc doping content is increased, the AlN-based compound has a higher dielectric constant.

Reference Example 3: Evaluation of Internal Electrode Material

Table 3 shows crystal characteristics of an internal electrode material usable with the AlN dielectric having a HCP crystal structure and a (0002) crystal 10 plane and its lattice mismatch rate (%) with the AlN dielectric.

TABLE 3

| Internal electrode material | Crystal structure | Crystal Plane | Preferred crystal orientation is formed or not | AlN HCP (0002) vs Lattice mismatch rate (%) |
|---|---|---|---|---|
| Mo | BCC | (110) | ○ | 14.11 |
| W | BCC | (110) | ○ | 14.11 |
| Ru | HCP | (0002) | ○ | 15.18 |
| Ti | HCP | (0002) | ○ | 5.42 |
| Pt | FCC | (111) | ○ | 12.43 |
| Al | FCC | (111) | ○ | 8.71 |

Referring to Table 2, if Mo and W with a BCC crystal structure ((110) crystal plane), Ru and Ti with an HCP crystal structure ((0002) crystal plane), or Pt and Al with an FCC crystal structure ((111) crystal plane) as internal electrode materials, the internal electrode materials exhibit a very low lattice mismatch rate of 20% or less with the AlN dielectric.

EXAMPLES

Example 1-1

A base layer including $SiO_2$ is deposited by sputtering on a silicon wafer. On the base layer, a seed layer including AlN is deposited to be 50 nm thick by sputtering.

On the seed layer, Mo (200 nm, a second internal electrode)/AlN (400 nm, a dielectric layer)/Ti (200 nm, a first internal electrode) in order are multiple times deposited by sputtering, but AlN is deposited as a last layer to form an electrode-dielectric layer stack.

Subsequently, the electrode-dielectric layer stack is grooved through a dry slope etching process.

Then, Mo and Ti are sequentially wet-etched, and $Al_2O_3$ is charged through an ALD process in a cavity formed by the wet-etching. In addition, SiN is patterned through a lift-off process at the top end of the electrode-dielectric layer stack.

Subsequently, Cu is deposited by sputtering at the outside of the electrode-dielectric layer stack to form an external electrode, manufacturing a multilayered capacitor according to Example 1-1.

Example 1-2

A multilayered capacitor according to Example 1-2 is manufactured in the same manner as in Example 1-1 except that Mo (200 nm)/Ti (50 nm), which is an internal electrode stack, is deposited instead of the second internal electrode formed right on the seed layer.

Example 1-3

A multilayered capacitor according to Example 1-3 is manufactured in the same manner as in Example 1-1 except that the seed layer is not introduced onto the base layer, and Ti (50 nm)/Mo (200 nm), which an internal electrode stack, is deposited instead of the second internal electrode formed right on the seed layer.

Example 1-4

A multilayered capacitor according to Example 1-4 is manufactured in the same manner as in Example 1-3 except that a seed layer (50 nm) including AlN is further deposited right on the base layer and right under the internal electrode stack.

EVALUATION EXAMPLES

Evaluation Example 1: Crystal Orientation Analysis According to Internal Electrode The multilayered capacitors according to Examples 1-1 to 1-4 are measured with respect to FWHM of each dielectric layer, and the results are shown in Table 4.

TABLE 4

| | Seed layer (average thickness) | Internal electrode stack (average thickness) Electrode 1 | Electrode 2 | Dielectric layer (average thickness) | Dielectric layer FWHM (°) |
|---|---|---|---|---|---|
| Example 1-1 | AlN 50 nm | Mo 200 nm | — | AlN (400 nm) | 1.855 |
| Example 1-2 | AlN 50 nm | Mo 200 nm | Ti 50 nm | AlN (400 nm) | 1.562 |
| Example 1-3 | — | Ti 50 nm | Mo 200 nm | AlN (400 nm) | 1.531 |
| Example 1-4 | AlN 50 nm | Ti 50 nm | Mo 200 nm | AlN (400 nm) | 1.466 |

Referring to Table 4, Examples 1-2 and 1-4, to which an internal electrode stack is applied, exhibit lower FWHM of the dielectric layer and thus relatively better c-axis crystal orientation than Example 1-1, to which a single internal electrode is applied.

Or, Example 1-4 including a seed layer exhibits lower FWHM of the dielectric layer and thus relatively better c-axis crystal orientation than Example 1-3 including no seed layer.

Figure 7:
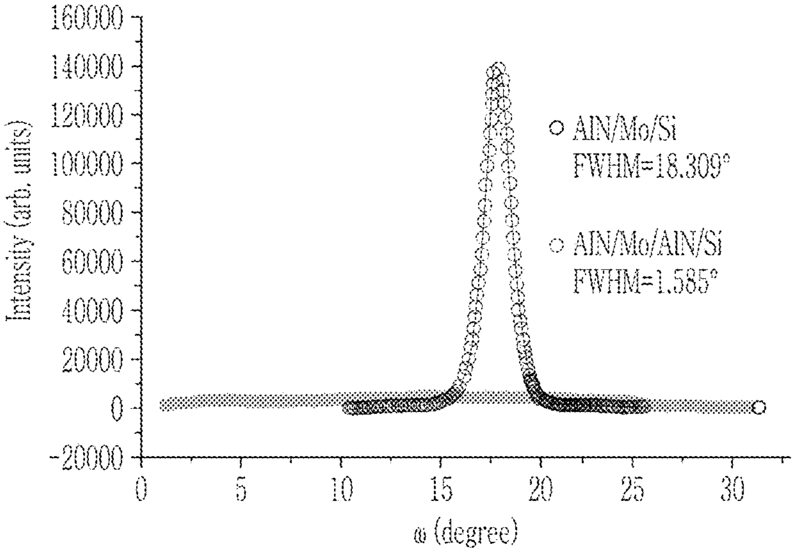
FIG. 7 is an XRD analysis graph of the dielectric layers included in the multilayered capacitors according to Example 2-1 and Example 2-2.

In addition, Table 5 and FIG. 7 show FWHM of each dielectric layer of the multilayered capacitors of Example 2-1 (having no seed layer) and Example 2-2 (having a seed layer), which have only a difference of having the AlN seed layer or not.

TABLE 5

| Dielectric layer AlN crystal orientation | Example 2-1 (Si/Mo/AlN) | Example 2-2 (Si/AlN/Mo/AlN) |
|---|---|---|
| FWHM (°) | 18.309 | 1.585 |

Referring to Table 5 and FIG. 7, the multilayered capacitor including the AlN seed layer according to Example 2-2 exhibits lower FWHM of the dielectric layer and thus relatively better c-axis crystal orientation than the multilayered capacitor according to Example 2-1.

While this invention has been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims.

DESCRIPTION OF SYMBOLS

100: multilayered capacitor
110: substrate
120: base layer
130: dielectric layer
141, 142: first and second internal electrode
143: internal electrode stack
161, 162: first and second external electrode
170: seed layer

What is claimed is:

1. A multilayered capacitor, comprising:

first internal electrodes having a first conducting material and second internal electrodes having a second conducting material different from the first conducting material;

a dielectric layer including an aluminum nitride (AlN)-based compound disposed between each pair of first and second internal electrodes except a bottommost pair of internal electrodes, wherein the bottommost pair of internal electrodes consists of the first internal electrode disposed directly on the second internal electrode, wherein the aluminum nitride-based compound includes AlN, or a doped AlN compound in which AlN is doped with Ni, Co, Mn, Cr, V, Zn, Re, Ta, Nb, Ti, Zr, Mg, Sc, Er, Y, La, or a combination thereof, the dielectric layer includes dielectric grains, and a crystal orientation of the dielectric grains is c-axis crystal orientation.

2. The multilayered capacitor of claim 1, wherein the aluminum nitride-based compound includes the AlN, or the doped AlN compound in which the AlN is doped with Sc, Er, Y, La, or a combination thereof.

3. The multilayered capacitor of claim 1, wherein a content (at %) of doped element in the doped AlN compound is greater than or equal to about 1 at % and less than about 30 at %.

4. The multilayered capacitor of claim 1, wherein the aluminum nitride-based compound included in the dielectric layer has a hexagonal (HCP) crystal structure and has a (0002) crystal plane.

5. The multilayered capacitor of claim 1, wherein an average thickness of the dielectric layer is in a range from about 20 nm to about 400 nm.

6. The multilayered capacitor of claim 1, further comprising a substrate;

a base layer on the substrate;

a capacitor body disposed on the base layer and including internal electrodes and dielectric layers arranged alternately; and an external electrode disposed on the base layer and disposed outside the capacitor body.

7. The multilayered capacitor of claim 6, wherein the internal electrodes include a first internal electrode and a second internal electrode, the first internal electrode and second internal electrode include a conductive metal including Mo, W, Ru, Ti, Pt, Al, or a combination thereof.

8. The multilayered capacitor of claim 6, wherein the internal electrodes include a conductive metal having a BCC crystal structure and a (110) crystal plane, a conductive metal having an HCP crystal structure and a (0002) crystal plane, a conductive metal having an FCC crystal structure and a (111) crystal plane, or a combination thereof.

9. The multilayered capacitor of claim 6, wherein the bottommost pair of internal electrodes is disposed between the base layer and one of the dielectric layers.

10. The multilayered capacitor of claim 6, wherein an average thickness of the internal electrodes is in a range from about 20 nm to about 400 nm.

11. The multilayered capacitor of claim 6, further comprising a seed layer between the base layer and the capacitor body.

12. A multilayered capacitor, comprising a substrate;

a base layer on the substrate;

a capacitor body disposed on the base layer and including internal electrodes and dielectric layers arranged alternately;

an internal electrode stack between the base layer and the dielectric layer; and an external electrode disposed on the base layer and disposed outside the capacitor body, wherein the dielectric layers include an aluminum nitride (AlN)-based compound including AlN, or a doped AlN compound in which the AlN is doped with Ni, Co, Mn, Cr, V, Zn, Re, Ta, Nb, Ti, Zr, Mg, Sc, Er, Y, La, or a combination thereof, the dielectric layers include a plurality of dielectric grains, and a crystal orientation of the dielectric grain is c-axis crystal orientation, the internal electrodes include a first internal electrode and a second internal electrode, the first internal electrode and second internal electrode include a conductive metal including Mo, W, Ru, Ti, Pt, Al, or a combination thereof, and conductive metals included in the first internal electrode and the second internal electrode are different, wherein the internal electrode stack consists of at least one layer of each of the conductive metals included in the first and second internal electrodes disposed on each other.

13. The multilayered capacitor of claim 12, wherein the aluminum nitride-based compound includes the AlN, or the doped AlN compound in which the AlN is doped with Sc, Er, Y, La, or a combination thereof.

14. The multilayered capacitor of claim 12, wherein a content (at %) of doped element in the doped AlN compound is greater than or equal to about 1 at % and less than about 30 at %.

15. The multilayered capacitor of claim 12, wherein the aluminum nitride-based compound included in the dielectric layer has a hexagonal (HCP) crystal structure and has a (0002) crystal plane.

16. The multilayered capacitor of claim 12, wherein an average thickness of the dielectric layer is in a range from about 20 nm to about 400 nm.

17. The multilayered capacitor of claim 12, wherein the internal electrode includes a conductive metal having a BCC crystal structure and a (110) crystal plane, a conductive metal having an HCP crystal structure and a (0002) crystal plane, a conductive metal having an FCC crystal structure and a (111) crystal plane, or a combination thereof.

18. The multilayered capacitor of claim 12, wherein an average thickness of the internal electrodes is in a range from about 20 nm to about 400 nm.

19. The multilayered capacitor of claim 12, further comprising a seed layer between the base layer and the capacitor body.

* * * * *